July 16, 1968   H. HILLMAN   3,392,588
DIFFERENTIAL HYDROMETER
Filed Oct. 20, 1967   2 Sheets-Sheet 2
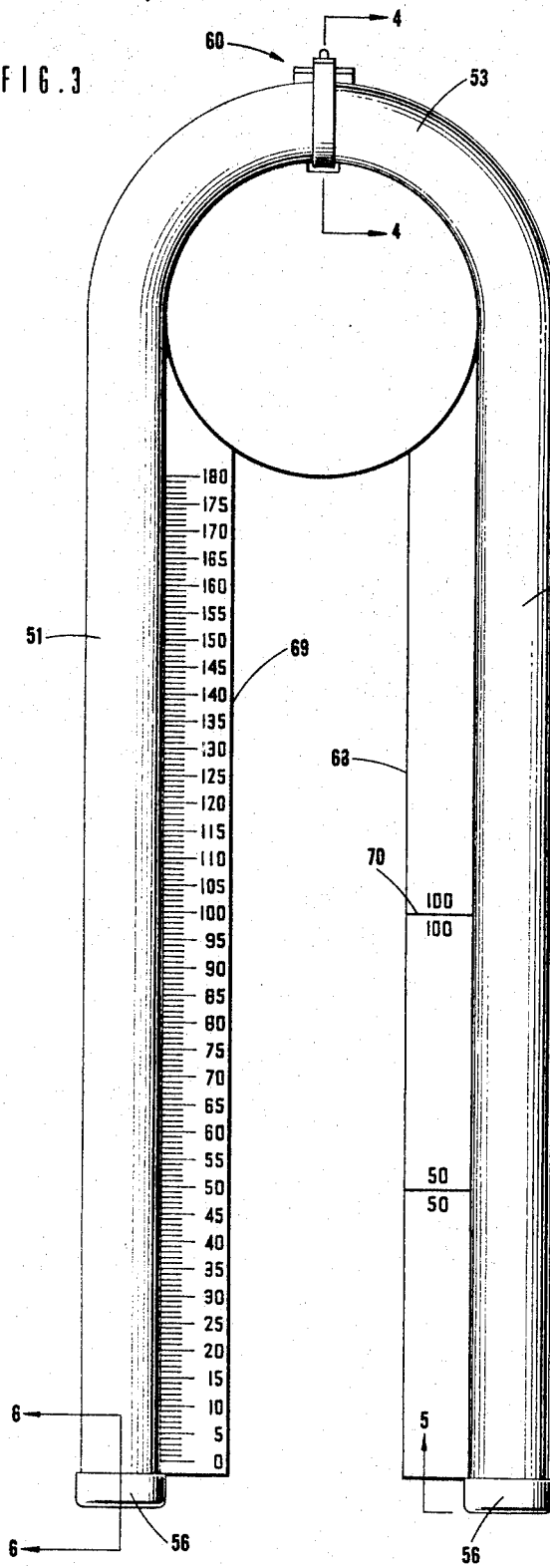
FIG. 3
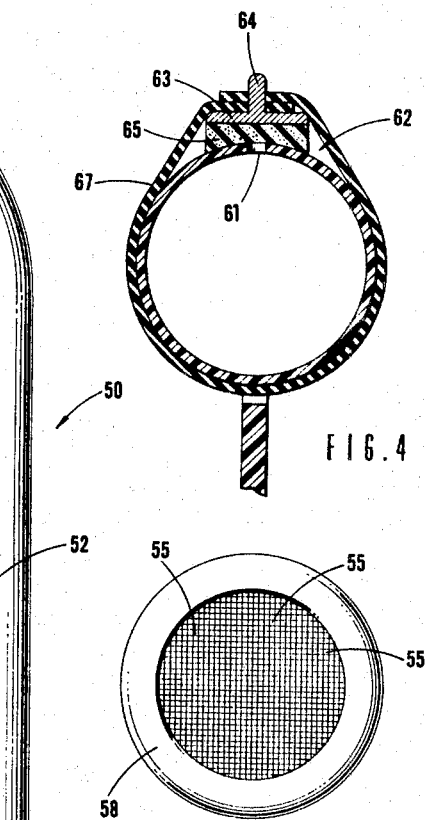
FIG. 4
FIG. 5
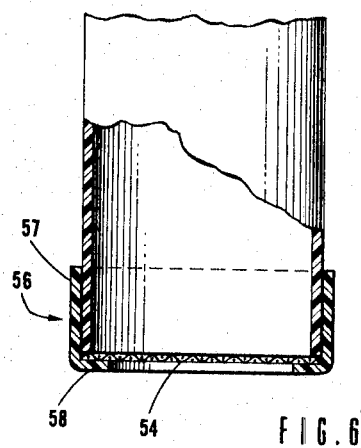
FIG. 6
INVENTOR
HERBERT HILLMAN
BY
Wolf, Greenfield & Hicken
ATTORNEYS

United States Patent Office 3,392,588
Patented July 16, 1968

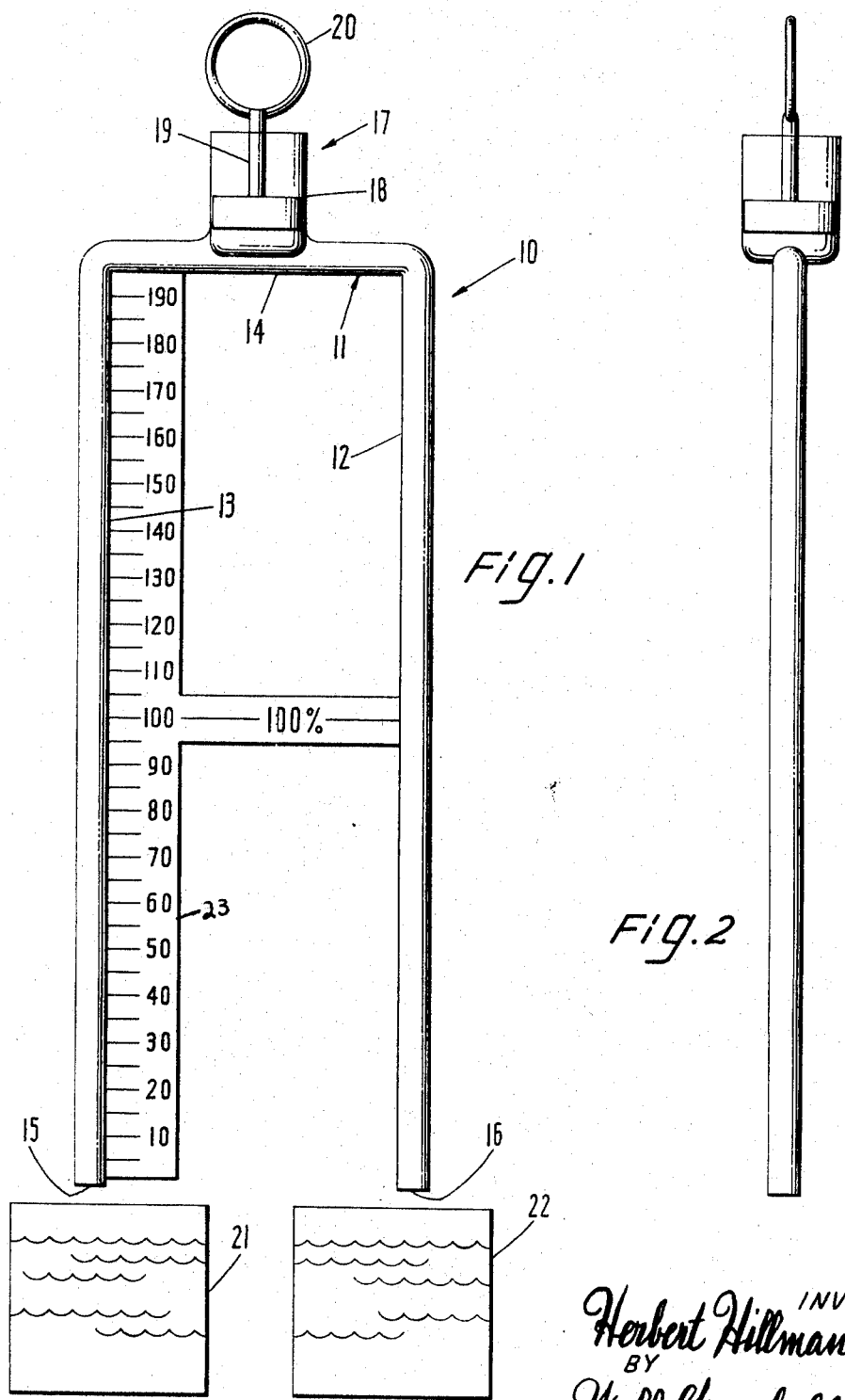

3,392,588
DIFFERENTIAL HYDROMETER
Herbert Hillman, 10 Tremont St.,
Boston, Mass. 02108
Continuation-in-part of application Ser. No. 520,467, Jan. 13, 1966. This application Oct. 20, 1967, Ser. No. 679,595
12 Claims. (Cl. 73—438)

ABSTRACT OF THE DISCLOSURE

A hydrometer-like device having two interconnected, volumetrically related, vertically extending vessels with each having an opening at its lower end through which different fluids may pass into the vessels. A common means comprising a tubular interconnection for creating a partial vacuum in the vessels is connected to the top of each of the vessels whereby different fluids may be drawn into, and commonly maintained in the vessels. Calibration means are associated with each of the vessels for relative measurement of the volumes of the different fluids commonly maintained in the vessels.

Cross-reference to related application

This is a continuation-in-part of application Ser. No. 520,467 filed Jan. 13, 1966.

Background of the invention

The present invention relates to a differential hydrometer and more particularly to a differential hydrometer particularly useful for measuring specific gravity of fluids rapidly with extreme accuracy and ease.

Many types of hydrometers are known for scientific and other applications. Often such hydrometers are subject to human and other error since the displacement volume is arbitrarily fixed. Common float-type hydrometers are often difficult to calibrate accurately and in some cases difficult to read and such instruments are often complex and costly devices.

An important object of this invention is to provide an instrument for measuring the relative densities of two different liquids rapidly and accurately.

Another object of this invention is to provide an instrument in accordance with the preceding object which is uncomplicated requiring little or no operator skill for accurate measurements.

Still another object of this invention is to provide an instrument in accordance with the preceding objects which is extremely inexpensive to construct and use.

Still a further object of this invention is to provide an accurate, uncomplicated method of determining specific gravity of a liquid.

According to the invention, a differential hydrometer comprises a pair of volumetrically related vessels each having an opening formed therein through which different fluids may pass into said vessels. Common means are provided for creating a partial vacuum in said vessels whereby the different fluids can be drawn into and commonly maintained in the vessels. Calibration means are associated with the vessels for relative measurement of the volumes of the different fluids commonly maintained in the vessels. The principle on which the hydrometer of this invention is based includes balancing two different columns of different liquids by the use of atmospheric or gas pressure and comparing their volume.

Summary of the invention

In the preferred embodiment of this invention, the vessels comprise legs of a U-shaped, substantially constant, diameter tube which is inverted and has parallel, equal length, downwardly extending legs which can be immersed in two different liquids. When one of the liquids is water, the resultant hydrometer can be used to obtain specific gravity by comparing the density of the water with the density of the second liquid. A common passageway within the tube is interconnected with a means for evacuating air within the tube to create an equal partial vacuum in both legs. One leg of the tube has a linear scale for comparing a volume of liquid, such as water, drawn up into the tube with a preselected volume of a second liquid to be tested. This construction is extremely inexpensive to manufacture and can operate with a minimum possibility of human error in a rapid and efficient manner to obtain accurate specific gravities.

In a specific embodiment of the invention, means are provided for minimizing the effect of capillary action to improve the accuracy of the device. In this embodiment, the legs are formed with inner diameters sufficiently wide to negate the effect of capillary action on introducing significant error into the tube. In addition, meshes are placed at the bottom of each leg to effectively divide the bottom of each leg into a plurality of small openings.

Brief description of the drawings

Other objects, features and advantages of the present invention are more fully disclosed in the following specification and accompanying drawings in which:

FIG. 1 is a front view of an embodiment thereof;
FIG. 2 is a side view thereof;
FIG. 3 is a front view of a preferred embodiment of the invention;
FIG. 4 is a cross-sectional detail taken along the line 4—4 of FIG. 3;
FIG. 5 is an end view taken along the line 5—5 of FIG. 3; and
FIG. 6 is a cross-sectional detail taken along the line 6—6 of FIG. 3.

Description of the preferred embodiments

With reference now to the drawings and more particularly FIG. 1, a differential hydrometer 10 is illustrated comprising a generally inverted, U-shaped tube 11 having two downwardly depending, parallel legs or vessels 12 and 13 with a common passageway 14 interconnecting passageways in the tubular legs 12 and 13. The lower ends of legs 12 and 13 are opened at 15 and 16. Legs 12 and 13 are of equal inside diameter and equal length. In the preferred embodiment, tube 11 has an inside diameter of ¼ inch. However, the diameter used can vary greatly so long as it is maintained large enough to prevent capillary lifting of liquids in use of the hydrometer as will be described. Within the common passageway 14 is located a means 17 for creating a partial vacuum in the legs 12 and 13 when openings 15 and 16 are closed as by immersion in a liquid.

The vacuum means 17 of the preferred embodiment comprises a bottle-like neck portion 18 fused to the glass tube 11. A diagrammatically shown piston 19 and finger gripping ring 20 are held in neck portion 18 by conventional means such as a bearing cap not shown. The piston 19 can be of any known type as for example those commonly used with air pressure pumps. Thus, raising of the piston 19 as shown in FIG. 1 will create a partial vacuum in the legs 12 and 13 when ends 15 and 16 are closed by a liquid. Alternatively, when the piston 19 is returned to its original position, the air passageway within the tube 11 is returned to normal atmospheric pressure.

Suitable vacuum creating means can be used in place of the specific means 17 shown. Thus, an elastic bulb can be employed or conventional air pump means used. Preferably, the air evacuation means 17 is operable by the hand of a user without supplementary power being necessary to operate the hydrometer 10.

In the differential hydrometer 10, a scale strip 23 is attached between legs 12 and 13 and preferably comprises a suitably calibrated plastic strip. The scale strip 23 of the preferred embodiment is a linear scale with an arbitrary point denoted as 100 percent adjacent the left-hand leg 13 which is designed to carry a column of water in its passageway. The 100-percent mark denotes a predetermined distance from the opened end 15. The same distance is marked off between the opened end 16 and the 100-percent mark on leg 12. The distance between the tube ends 15 or 16 and the 100-percent mark is preferably a vertical distance when the hydrometer is vertically positioned with the two marks indicating 100 percent preferably lying in a horizontal plane. The scale associated with the left-hand leg 13 reads from 0 to 190 and is graduated in equal linear increments as shown with "0" being the bottom opened end 15 of the tube.

Turning now to the use of the hydrometer 10 of this invention, the ends of parallel legs 12 and 13 are brought down into liquids preferably maintained at equal levels in tanks 21 and 22 respectively. Tank 21 contains pure water and tank 22 maintained at the same temperature as tank 21 and preferably room temperature, contains a known or unknown liquid whose specific gravity is to be determined. The plunger 19 is then raised to create a substantially uniform partial vacuum in the tube 11 causing equal weights of pure water and the liquid to be tested in tank 22 to be drawn into legs 13 and 12 respectively and the pressure exerted by the two columns formed is balanced due to the atmospheric pressure acting on the surface of the liquids in the tanks 21 and 22. While the weights of the liquids which are drawn up in columns within the legs 13 and 12 are equal, if their densities are unequal, different volumes of liquids will enter the legs 13 and 12.

The plunger 19 is withdrawn until the unknown liquid, which can be alcohol for example, rises in leg 12 to form a column extending slightly above the 100-percent mark. The hydrometer is then removed from the tanks or left in the tanks, and the plunger 19 depressed until the column of unknown liquid in leg 12 has a meniscus at the 100-percent mark indicated on leg 12. At this point, the top of the column of water is compared with the scale 23 and a reading taken. Thus, the volume of liquid in leg 13 is compared with a predetermined volume of liquid in leg 12 with the weight of each column of liquid being identical. When alcohol is the unknown liquid or chemical liquid in tank 22, it is found that the column of pure water in leg 13 rises to about or just below the 80 percent calibration on leg 13 and its specific gravity is read as 0.8. When sulfuric acid is the unknown liquid in tank 22 and it is denser than water, the volume of water in column 13 will rise to about the 180 percent calibration and is read as a specific gravity of 1.8.

Thus, it will be understood that the density of any liquid can be compared with the density of water or any other liquid by the use of the instrument of this invention. Direct readings are obtained for liquids either heavier or lighter than water when specific gravity determinations are carried out. Preferably, the vertical height or length of the water column directly indicates the specific gravity of the unknown liquid and a true, accurate specific gravity reading is directly obtained. If the legs 12 and 13 are curved and/or of different known diameters, the pressure exerted by each column of liquid is balanced with the other and their balance compared by a suitably calibrated scale which is related to the vertical height of each column.

While a specific embodiment of this invention has been shown and described, it should be understood that many variations thereof are possible without departing from the spirit and scope of this invention. While member 11 is preferably a glass tube, other materials such as plastic can be used. Similarly, although the diameter of the tube 11 is constant, in some cases the diameter can differ by predetermined proportions with appropriate compensation in the calibration used. It is preferred to use a linear scale in all cases. Similarly, it is preferred to place the openings 15 and 16 the same distance from the preselected point or mark indicating 100 percent on each leg 12 and 13 although this can be varied in some cases. It is preferred to keep the level of the water and liquid to be treated at the same distance above or below sea level although compensation can be made if there is a substantial variation in the levels of liquids in the tanks 21 and 22. The vessel portions or legs 12 and 13 need not be circular in cross section but could have other configurations. The opened ends of legs 12 and 13 can be cured or uniformly tapered. The hydrometer 10 can be provided with two small cups into which ends 15 and 16 extend and which can be filled with the two liquids whose densities are to be compared. In all cases, it is preferred that the scale be correlated with the vertical distance from openings 15 and 16 of each mark or increment indicia on the scale.

Referring now to the embodiment of the invention illustrated in FIGS. 3 to 6 inclusive, there is shown a hydrometric instrument which is designed to compensate for capillary action of the fluids being measured. In this arrangement, the inverted, U-shaped tube 50 is formed with legs 51 and 52 continuously with one another and interconnected by a bight section 53. The inner diameters of the U-shaped legs 51 and 52 are preferably equal to one another and are uniform along their entire length. The diameters of these legs 51 and 52 should be of sufficient minimum size to negate the effect of capillary action of the fluids being measured in these tubes. Thus, for example, for most fluids being tested including water, alcohol and the like, an inner diameter in the order of magnitude of at least ¼ inch to ½ inch is satisfactory.

At the bottom of each of the legs 51 and 52 is affixed a screen or mesh 54. This screen or mesh may be formed of a metal or, if metal is reactive with the materials normally being measured, of some organic plastic material which is nonreactive. The screen or mesh 54 should have a plurality of fine openings 55 which effectively divide the bottom end of each leg into a multiude of separate openings. The screen may be suitably secured to the lower end of the legs 51 and 52 by suitable means such, for example, as a retaining collar 56 having a sidewall 57 and an inwardly flared lip 58 that engages the periphery of the screen 54 and secures it against the bottom of the leg. The collar 54 may be forced fit or otherwise suitably secured to the leg.

If desired, means similar to the means previously described, may be used for raising the fluids in the legs 51 and 52. Alternatively, however, in the preferred form, a means for raising or maintaining a fluid level in the legs comprises means generally indicated at 60. In this arrangement, there is provided a small opening 61, preferably centrally located, in the bight section 53 and extending upwardly. A stopper or closure 62 is normally positioned over the opening 61. This closure 62 may for example comprise a hard, plastic cap 63 having a finger handle or grip 64 with a resilient foam rubber or similar deformable lower surface 65 adapted to seal the opening 61 when the closure 62 is positioned over it. The closure 62 is normally maintained in a closed position by suitable means such, for example, as the rubber band 67 which encircles and the bight section 53 and the closure 62 normally tensioning the closure to a closing position over the opening 61.

Also provided in this embodiment are the scale means 68. Scale 68 may be calibrated with a reference line such as indicated at 70, to measure the level of the known fluid against which the unknown fluid is to be compared. The scale 69 affixed to and adjacent to the other leg 51 is calibrated similarly to scale 23 of the embodiment illustrated in FIG. 1. The calibrations 68 and 69 should be determined by known techniques taking into consideration the nature of the materials which will normally be measured in this particular instrument.

In the operation of this device, the hydrometric unit is used in a manner quite similar to the embodiment previously described with certain exceptions. In this arrangement, instead of using a syringe or plunger to raise the level of the liquids in the legs 51 and 52, the two legs 51 and 52 are dipped into their respective unknown and known liquids with the closure 62 removed or spaced from opening 61. The leg 52 is moved into the known liquid until it reaches a point substantially above the 100-level mark. The opening 61 is then closed and the hydrometric device is raised upwardly from but not completely out of the liquids. The level of the known fluid in the leg 52 is then adjusted until the upper surface of the known fluid reaches the level of the 100-percent mark. This may be accomplished by temporarily removing the closure 62 from the opening 61 thereby allowing the fluids to run down the leg 52 until it reaches its selective level. Once the fluid reaches the level 100, the closure is replaced over the opening 61 and a relevant measure of hydrometric values may be attained.

I claim:

1. A differential hydrometer comprising a pair of interconnected, volumetrically related, vertically extending vessels each having an opening formed therein at its lower end through which different fluids may pass into said vessels, common means for creating a partial vacuum in said vessels whereby said different fluids may be drawn into and commonly maintained in said vessels, and calibration means associated with said vessels for relative measurement of the volumes of said different fluids commonly maintained in said vessels.

2. A differential hydrometer in accordance with claim 1 wherein said calibration means comprises a linear scale and each of said vessels have a constant cross-sectional area along its vertical length.

3. A differential hydrometer in accordance with claim 1 wherein said vessels are integral and define substantially an inverted U-shaped tube.

4. A differential hydrometer in accordance with claim 3 wherein said tube has downwardly depending open-ended legs defining said vessel openings.

5. A differential hydrometer in accordance with claim 4 wherein said legs are of equal inner diameter and extend downwardly at equal linear distances from predetermined points thereon lying in a horizontal plane.

6. A differential hydrometer in accordance with claim 1 wherein said common means comprises a reciprocal piston for creating said partial vacuum whereby atmospheric pressure acts to balance said fluids.

7. A differential hydrometer in accordance with claim 5 wherein said calibration means comprises a linear scale divided in equal increments from said predetermined points to the opened end of one of said legs.

8. A device as set forth in claim 3 wherein said common means comprises means forming an opening in the bight of said inverted U-shaped tube.

9. A device as set forth in claim 4 including means constricting the lower ends of said legs.

10. A device as set forth in claim 9 wherein said means for constricting said lower end of said legs includes a mesh dividing the openings at the bottom of each leg into a plurality of openings.

11. A device as set forth in claim 10 wherein said common means comprises means forming an opening in the bight of said inverted U-shaped tube.

12. A device as set forth in claim 11 including a closure means for said opening in the bight adapted to removably close said opening in the bight.

References Cited

UNITED STATES PATENTS

| 2,018,441 | 10/1935 | Edelmann | 73—443 |
| 2,031,025 | 2/1936 | Altmayer | 73—441 |

RICHARD C. QUEISSER, Primary Examiner.

JAMES GIILL, Examiner.

E. D. GILHOOLY, Assistant Examiner.